United States Patent [19]
Dolan et al.

[11] Patent Number: 5,751,948
[45] Date of Patent: May 12, 1998

[54] SYSTEM FOR PROCESSING HVAC CONTROL INFORMATION

[75] Inventors: Robert P. Dolan, Syracuse; Thomas R. Phillips, Cicero; Thomas L. DeWolf, Liverpool; Mark A. Hill, Lafayette, all of N.Y.

[73] Assignee: Carrier Corporation, Syracuse, N.Y.

[21] Appl. No.: 578,350

[22] Filed: Dec. 26, 1995

[51] Int. Cl.$^6$ .................................................. G06F 11/00
[52] U.S. Cl. ................................ 395/185.07; 395/185.05
[58] Field of Search .......................... 395/184.01, 185.07, 395/185.05, 185.02, 185.01; 371/21.1, 21.2, 21.5, 25.1, 53, 57.1, 40.11, 40.4, 40.13, 51.1, 49.2; 364/557, 136; 236/51

[56] References Cited

U.S. PATENT DOCUMENTS

| | | | |
|---|---|---|---|
| 3,786,415 | 1/1974 | Phillips et al. | 371/47.1 |
| 3,832,733 | 8/1974 | Eldridge | 340/174.18 |
| 4,493,081 | 1/1985 | Schmidt | 395/185.07 |
| 4,526,010 | 7/1985 | Sato et al. | 371/34 |
| 4,817,095 | 3/1989 | Smelser et al. | 371/40.2 |
| 4,982,404 | 1/1991 | Hartman | 371/62 |
| 5,097,449 | 3/1992 | Cuevas | 365/228 |
| 5,103,391 | 4/1992 | Barrett | 364/133 |
| 5,104,037 | 4/1992 | Karg et al. | 236/46 R |
| 5,111,457 | 5/1992 | Rabjohns et al. | 371/10.1 |
| 5,309,445 | 5/1994 | Bartels | 371/21.3 |
| 5,357,525 | 10/1994 | Moriue et al. | 371/32 |
| 5,359,659 | 10/1994 | Rosenthal | 380/4 |
| 5,426,585 | 6/1995 | Stepper et al. | 364/424.03 |
| 5,454,510 | 10/1995 | Manson et al. | 236/51 |
| 5,495,722 | 3/1996 | Manson et al. | 236/51 |
| 5,539,879 | 7/1996 | Pearce et al. | 395/184.01 |
| 5,553,238 | 9/1996 | Nelson | 395/185.07 |
| 5,555,269 | 9/1996 | Friday et al. | 364/185 |
| 5,555,509 | 9/1996 | Dolan et al. | 364/505 |
| 5,565,855 | 10/1996 | Knibbe | 340/825.06 |
| 5,579,482 | 11/1996 | Einkauf et al. | 395/200.1 |
| 5,579,993 | 12/1996 | Ahmed et al. | 236/49.3 |
| 5,590,831 | 1/1997 | Manson et al. | 236/51 |

FOREIGN PATENT DOCUMENTS

| | | | |
|---|---|---|---|
| 615211 | 9/1994 | European Pat. Off. | G07B 17/02 |
| 63-298602 | 6/1988 | Japan | G05B 9/02 |
| 05165734 | 2/1993 | Japan | G06F 12/16 |
| 07210215 | 11/1995 | Japan | G05B 15/02 |

*Primary Examiner*—Robert W. Beausoliel, Jr.
*Assistant Examiner*—Joseph E. Palys

[57] ABSTRACT

HVAC control information is written in a particular manner to a memory associated with a programmable processor. The processor generates verification images of the information and stores the same along with the information in addressable memory locations. The stored information and its corresponding verification images is read back for verification as to having been correctly stored in addressable memory locations. A rewriting and rereading of the information and the respective verification images can occur up to a predetermined number of times if necessary to verify that the information and respective verification images have been correctly stored.

27 Claims, 8 Drawing Sheets

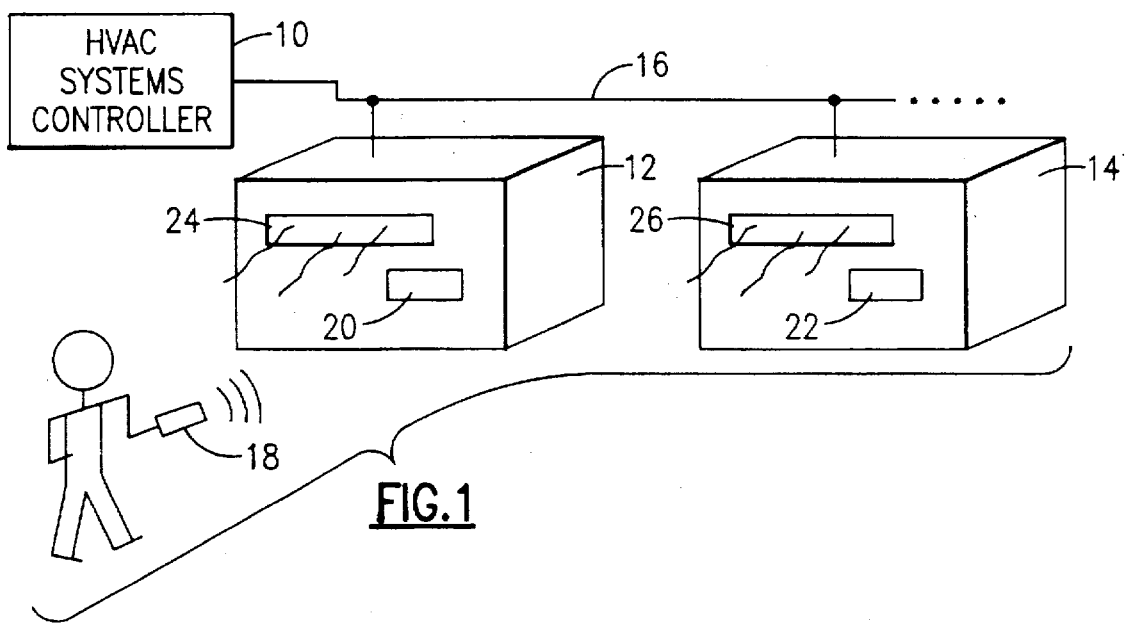
FIG.1
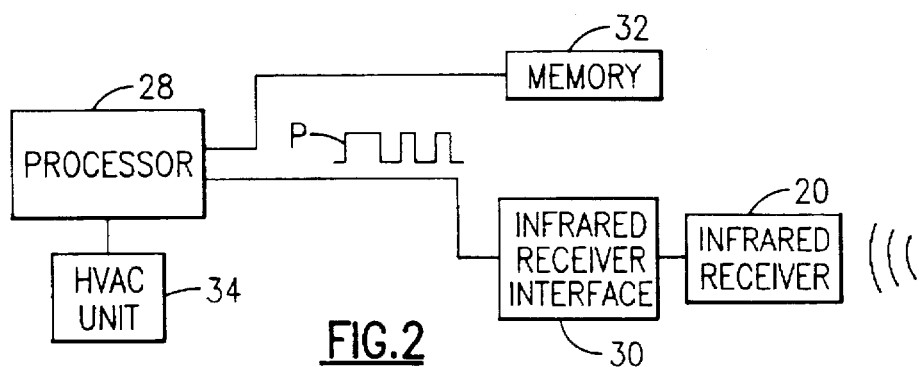
FIG.2
FIG.3
| MEMORY ADDRESS INDEX "i" | ADDRESSABLE LOCATION | |
|---|---|---|
| | PARAMETER STORED IN LOWER BYTE | TYPE OF VERIFICATION IMAGE IN UPPER BYTE |
| 0 | HEAT CONTROL | SAME VALUE |
| ⋮ | ⋮ | ⋮ |
| 5 | FAN CONTROL | SAME VALUE |
| 6 | HVAC TYPE | ONES COMPLEMENT |
| 7 | HVAC TYPE | ONES COMPLEMENT |
| 8 | HVAC TYPE | ONES COMPLEMENT |
| 9 | NETWORK ID | TWOS COMPLEMENT |
| 10 | NETWORK ID | TWOS COMPLEMENT |
| 11 | NETWORK ID | TWOS COMPLEMENT |

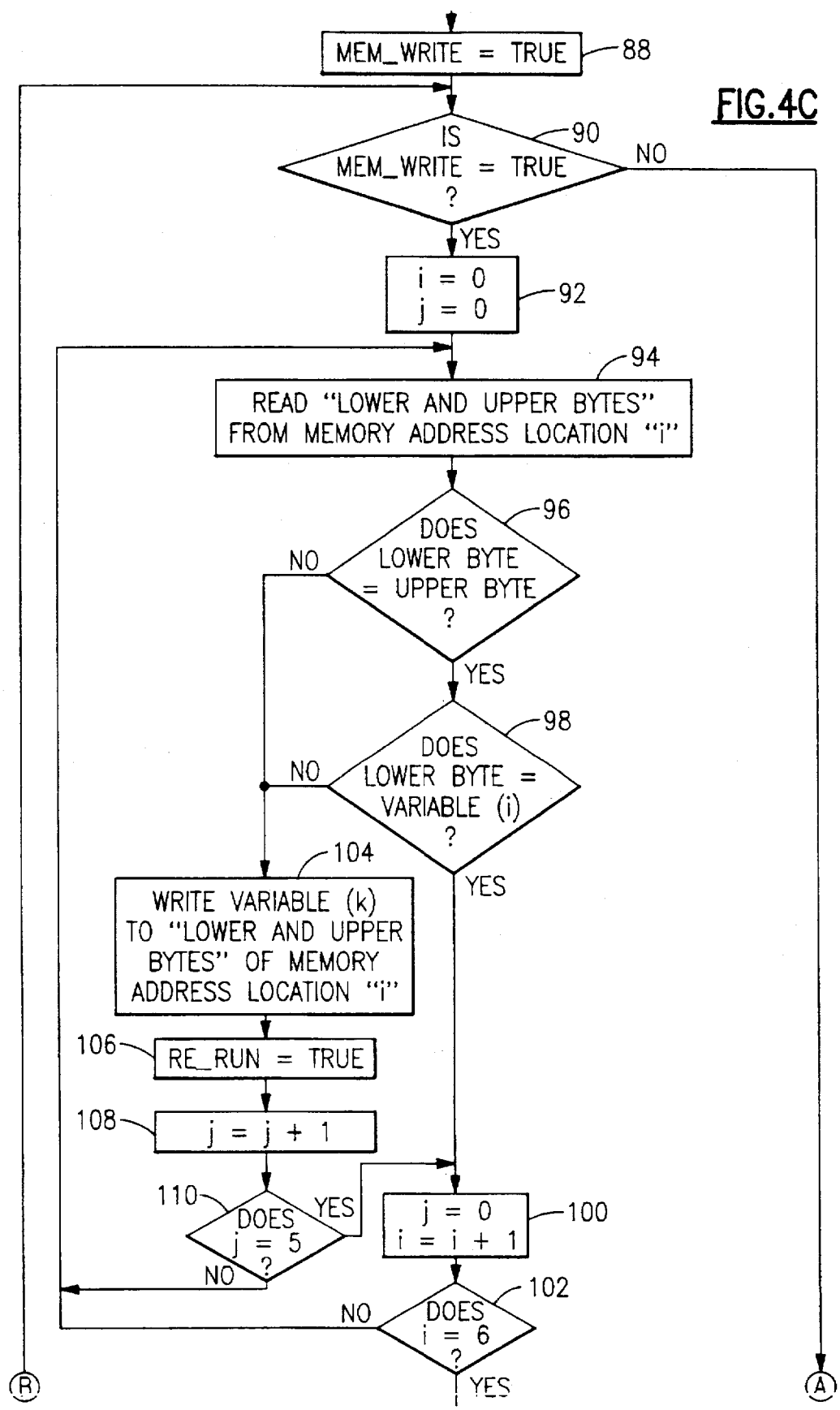

| MEMORY ADDRESS INDEX "i" | CONTROL VARIABLE | HEADER BYTE CODE | DEFAULT VALUES | RANGE OF VALUES |
|---|---|---|---|---|
| 0 | VARIABLE (0) | CODE 1 | DEFAULT 1 | RANGE 1 |
| ⋮ | ⋮ | ⋮ | ⋮ | ⋮ |
| 5 | VARIABLE (5) | CODE 6 | DEFAULT 6 | RANGE 6 |
| 6 | UNIT_TYPE | CODE 7 | DEFAULT 7 | RANGE 7 |
| 7 | UNIT_TYPE | CODE 7 | DEFAULT 7 | RANGE 7 |
| 8 | UNIT_TYPE | CODE 7 | DEFAULT 7 | RANGE 7 |
| 9 | NTWK_ID | CODE 8 | DEFAULT 8 | RANGE 8 |
| 10 | NTWK_ID | CODE 8 | DEFAULT 8 | RANGE 8 |
| 11 | NTWK_ID | CODE 8 | DEFAULT 8 | RANGE 8 |

FIG.5

SYSTEM FOR PROCESSING HVAC CONTROL INFORMATION

BACKGROUND OF THE INVENTION

This invention relates to the storage of information used in the control of a heating ventilating and air conditioning (HVAC) system. In particular, this invention relates to how certain information may be received and thereafter stored in a memory associated with a programmable processor that controls the functions being performed by the HVAC system.

HVAC systems are typically being, controlled today by a programmable processor executing various control programs that control the functions being performed by these systems. The control programs typically rely on information that is often tailored to the particular HVAC system. This information may be stored in a memory associated with the processor. It is important that the integrity of this stored information be assured when it is being written to the memory. The integrity of this stored information can often be assured by controlling the environment in which the information is being written to memory. The integrity of this stored information can also be assured by reading back any stored information and manually checking to see whether the information has been accurately recorded. It may, however, not be possible to write to memory in an ideal environment or to take the time necessary to read back the information and manually confirm that it was correctly written to memory.

OBJECTS OF THE INVENTION

It is an object of the invention to provide a process for accurately storing recallable HVAC control information in a memory associated with a programmed processor in a variety of conditions and circumstances which might include a potentially high electrical noise environment.

It is another object of the invention to provide an HVAC system with the capability of quickly, easily and reliably receiving and storing, information regarding the operation of the HVAC system.

SUMMARY OF THE INVENTION

The above and other objects of the invention are achieved by preferably providing a heating or cooling system with the capacity to receive signals containing HVAC control parameter information that is to be used in conjunction with the control of the system. The signals contain an identification of a control parameter as well as a value of the control parameter in a signal format that is recognizable by a processor. The values of the control parameters are preferably stored by the processor in one or more addressable locations of a memory associated with the processor. The processor furthermore transforms the values of the control parameters into verification images that are stored in the same addressable memory locations that have received the values of the control parameters. In accordance with the invention, the processor preferably uses at least some mathematical transformations that are particularly unique and specific to the respective control parameters when transforming values of these control parameters into their respective verification images.

The process of storing values of control parameters and respective verification images is preferably followed by a reading of the addressable memory locations containing the values and their respective verification images. In the event that any value and its verification image cannot be correctly read and verified as to having been correctly stored, then the steps of storing and thereafter reading and verifying values and verification images of the control parameters are repeated. The process of storing the values and verification images and thereafter reading and verifying these stored values is preferably repeated until all such stored values and verification images can be correctly read and verified. In accordance with still another aspect of the invention, several attempts may be made if necessary to store a value and its respective verification image to a particular memory location before proceeding to read a value and its respective verification image in the next memory location. Any repetitive storing of a value and its respective verification image will prompt the processor to repeat the entire process of reading, verifying and storing the values of the control parameters and their respective verification images.

BRIEF DESCRIPTION OF THE DRAWINGS

Other objects and advantages of the present invention will be apparent from the following description in conjunction with the accompanying drawings in which:

FIG. 1 illustrates a plurality of HVAC systems each connected via a common control bus to an HVAC systems controller;

FIG. 2 illustrates a particular HVAC system having a processor connected to the control bus of FIG. 1 and being furthermore connected to an HVAC unit for providing conditioned air;

FIG. 3 illustrates the storage of information for the HVAC system of FIG. 2 in a memory associated with the processor of FIG. 2;

FIGS. 4A–4F illustrate a process executable by the processor of FIG. 2 for reading information from as well as writing information to the memory associated with the processor; and FIG. 5 illustrates a look up table used by the processor in executing the process of FIGS. 4A–4F.

DESCRIPTION OF THE PREFERRED EMBODIMENT

Figure 4A:
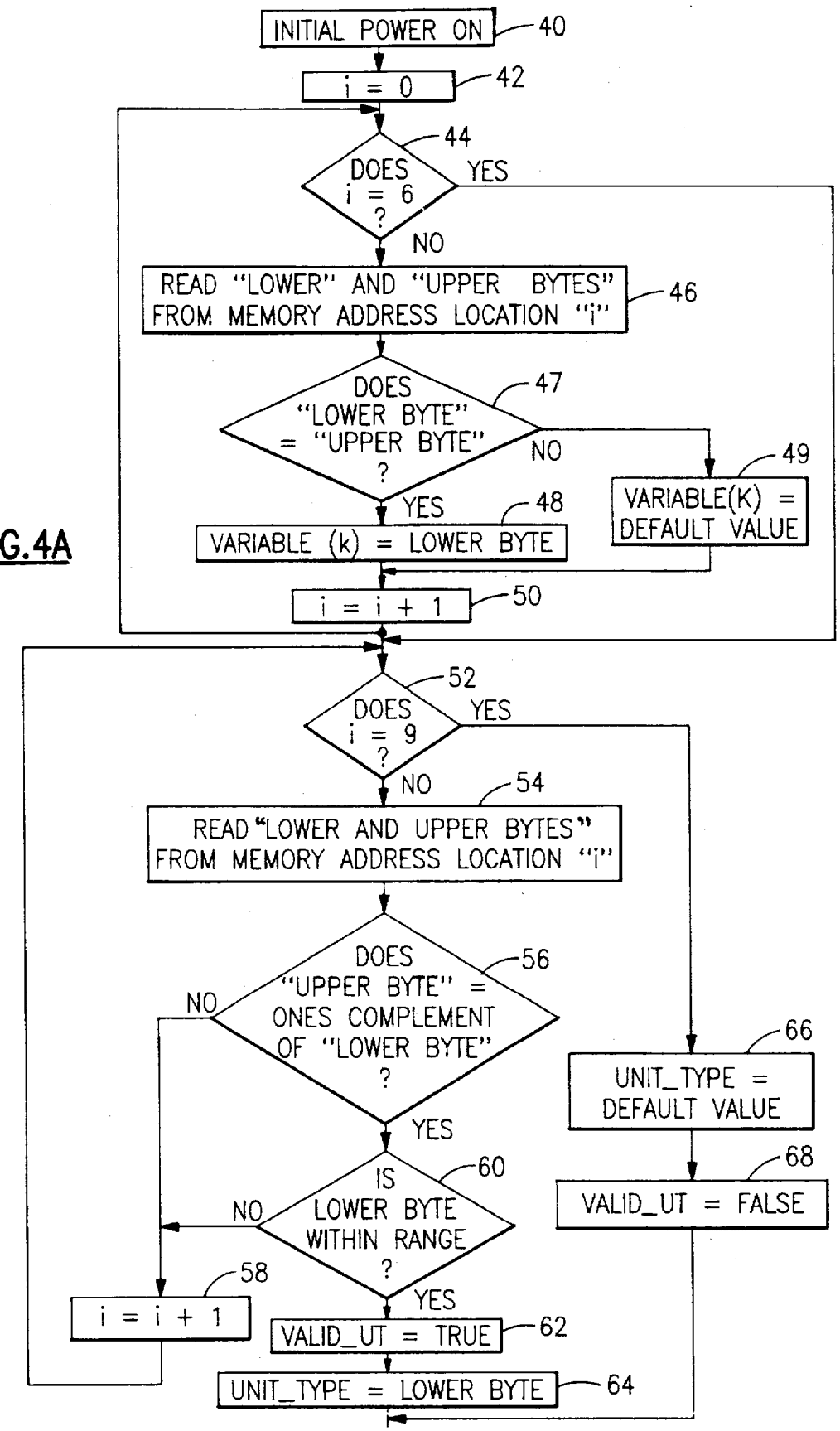
Figure 4B:
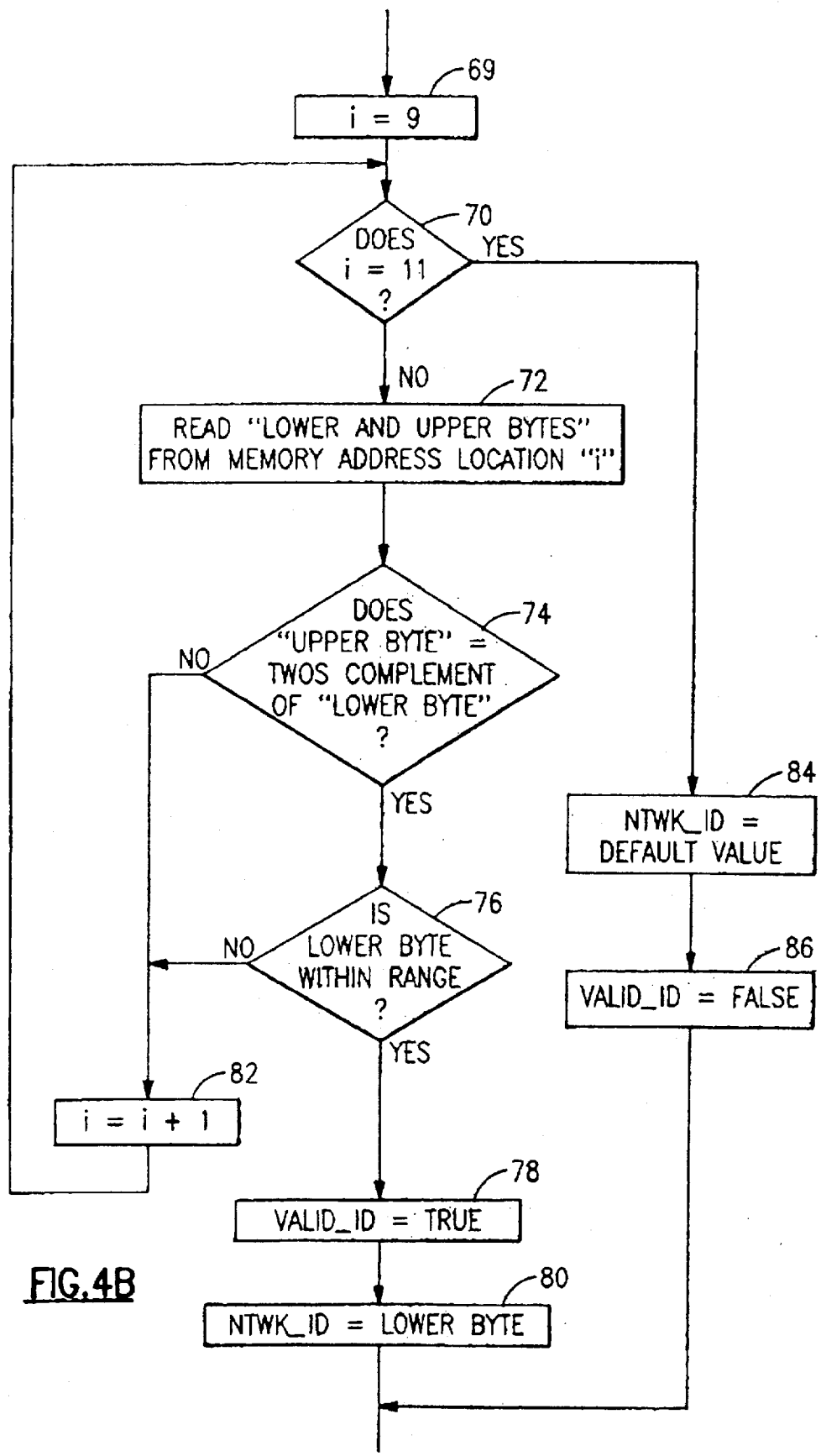
Figure 4D:
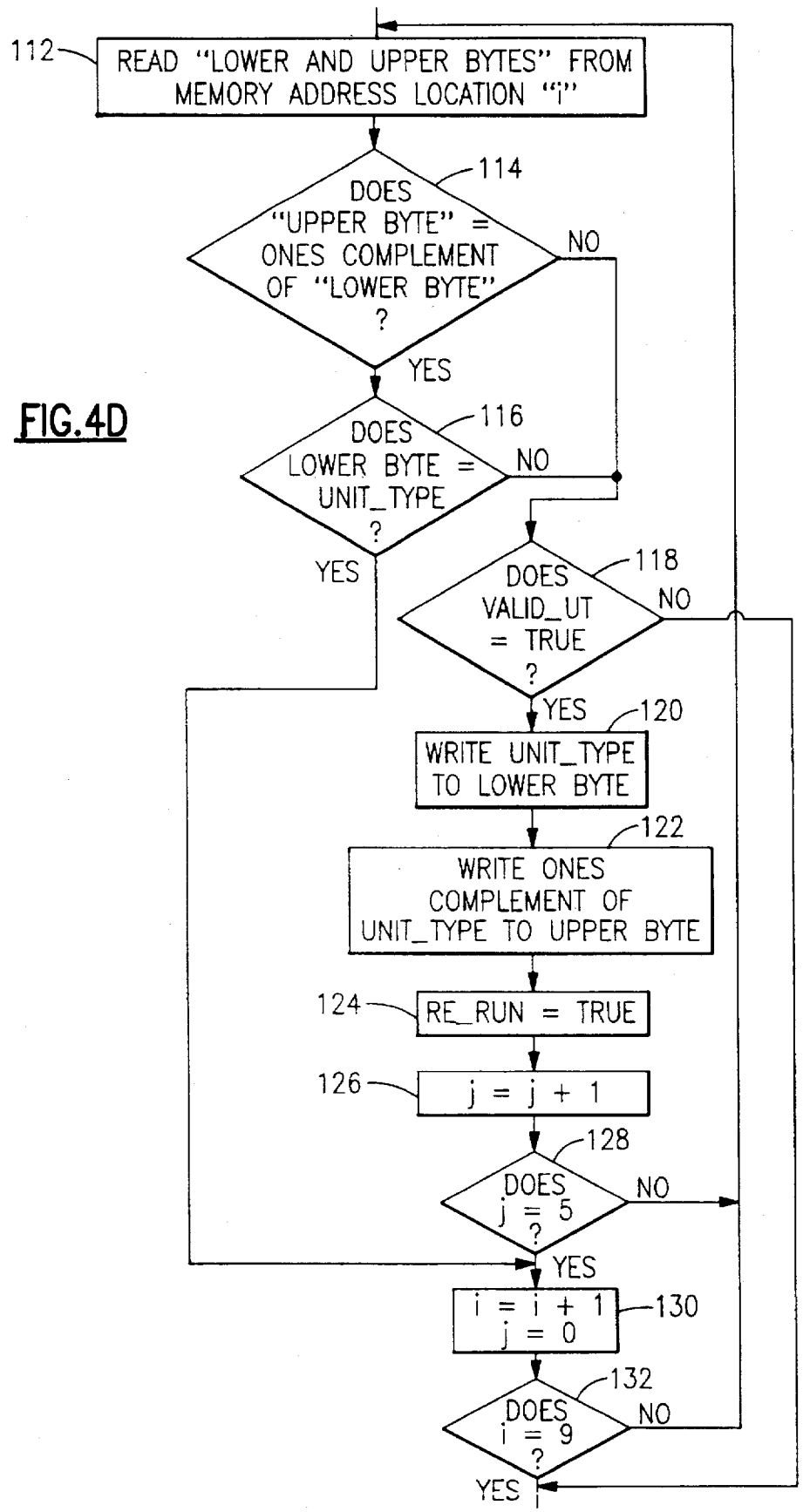
Figure 4E:
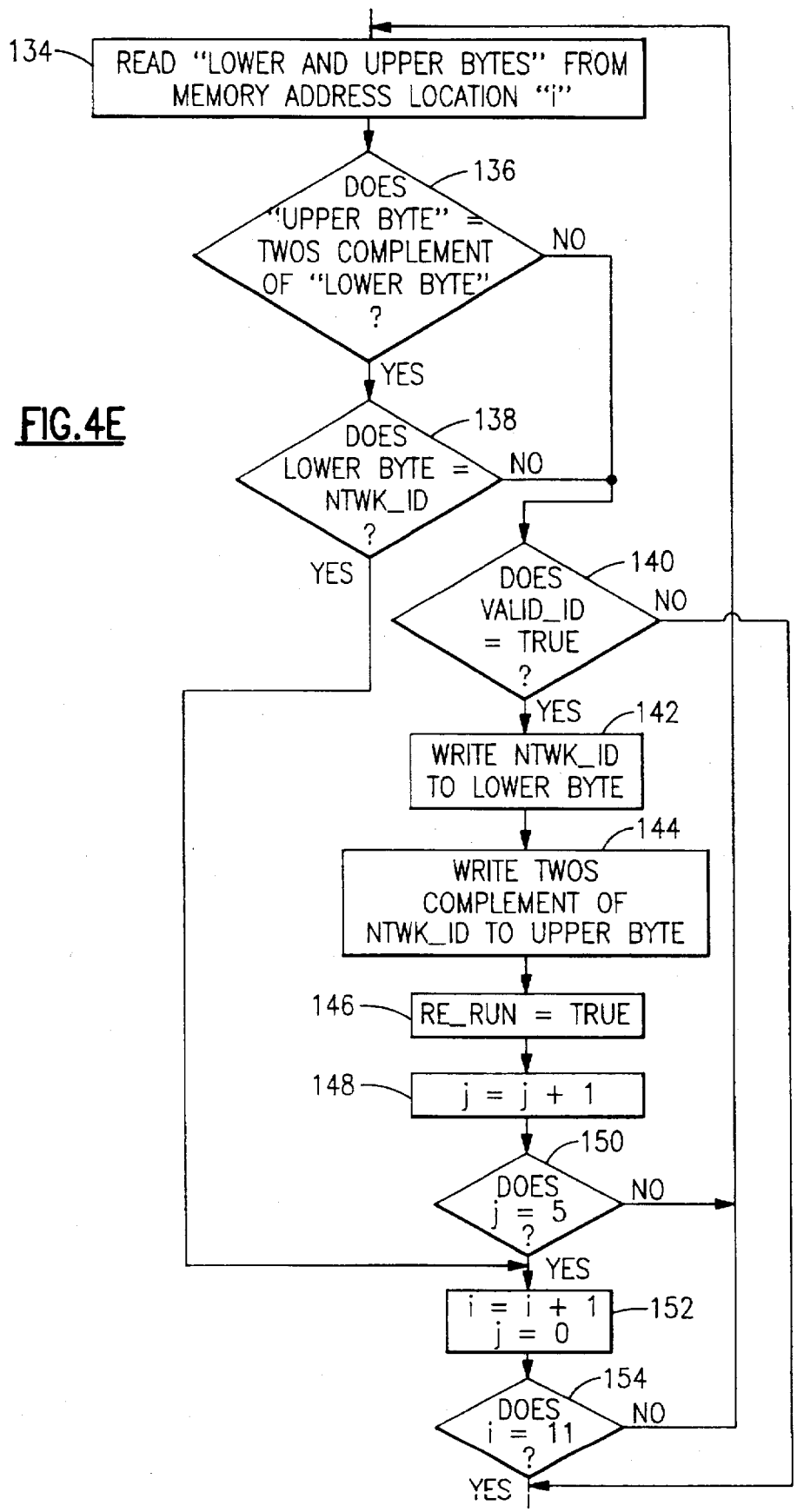
Figure 4F:
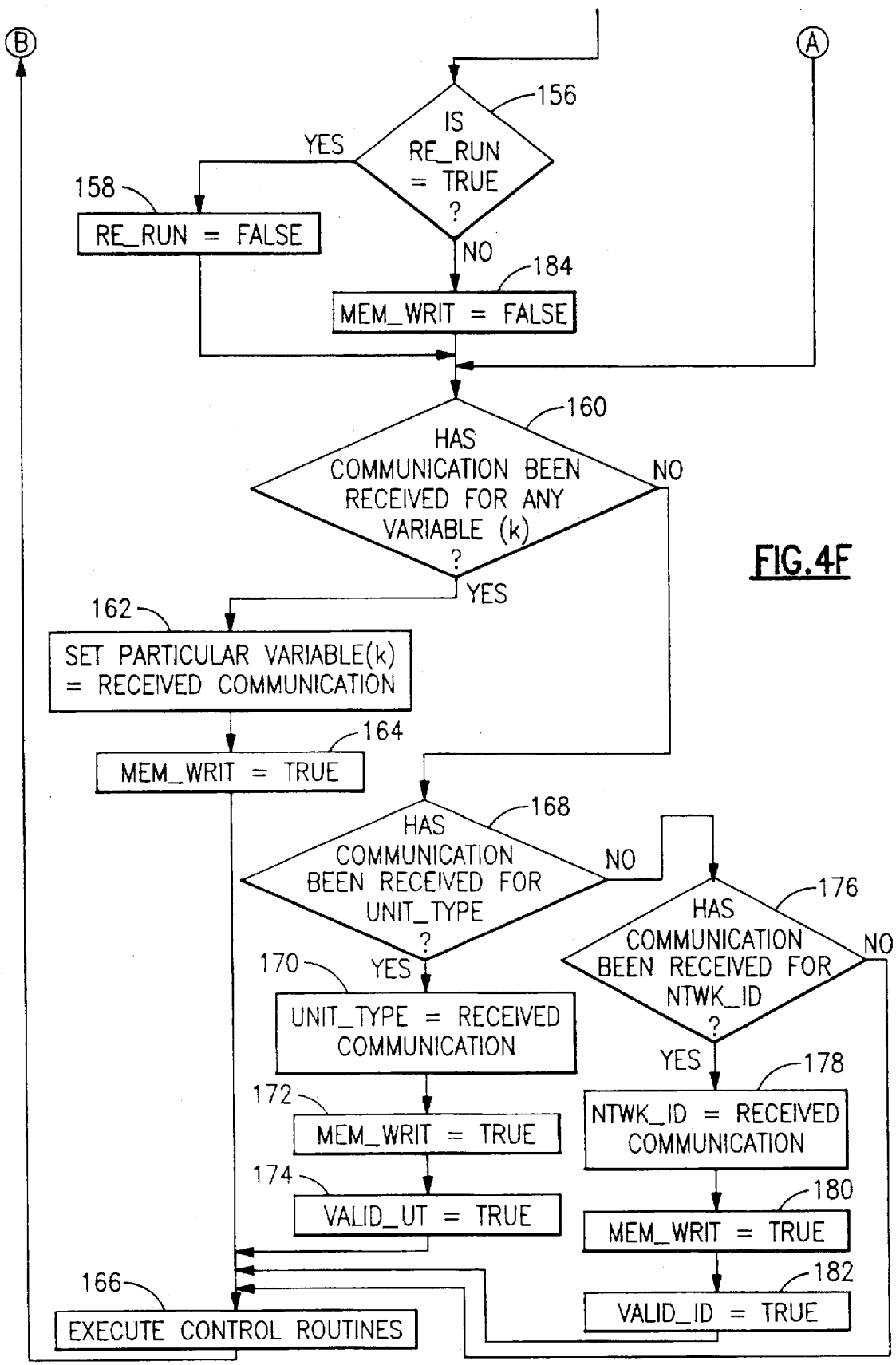

Referring to FIG. 1, an HVAC systems controller 10 is connected to an HVAC system 12 and an HVAC system 14 via a control bus 16. Each HVAC system receives control information from the HVAC systems controller 10 or, in the alternative, from a hand held remote control device 18. The HVAC system 12 receives the remote control signal at a infrared receiver 20 whereas the HVAC system 14 receives the remote control signal at a infrared receiver 22. The HVAC system 12 provides conditioned air through a ventilated opening 24 whereas the HVAC system 14 provides conditioned air via a ventilated opening 26. It is to be appreciated that there may be many more HVAC systems connected to the control bus 16. These HVAC systems may be installed in one large room or in several rooms of a building that is to be air conditioned by the various systems. Control information is normally provided to each individual system by the HVAC system controller 10 identifying a particular HVAC system through a network identification and thereafter communicating information to that particular system having that particular network identification.

Referring now to FIG. 2, the internal configuration of the HVAC system 12 is illustrated. A processor 28 within the HVAC system 12 receives control information from either the control bus 16 or from an infrared receiver interface 30 associated with the infrared receiver 20. Control information is received from either source in a predefined format. The formatted information is to be stored in a particular manner in a control memory 32 associated with the processor 28. The control memory 32 is preferably a non-volatile memory such as an electrically erasable programmable read only memory (EEPROM). Control information stored in such a memory will survive a power outage. The processor utilizes the stored control information in the memory 32 to control a particular HVAC unit 34 within the HVAC system 12. The HVAC unit 34 may be one of several different types of HVAC units. The particular type is preferably identified by a separate unit type control parameter stored in the memory 32.

Referring to the remote control device 18 and the infrared receiver 20, at least two particular pieces of control information are preferably transmitted from the remote control device 18 to the infrared receiver 20. These are the network identification that is to be assigned to the particular HVAC system 12 and the indication as to what the HVAC unit 34 is in terms of particular type of HVAC unit. The signals for these two pieces of information coming from the remote control device will have a particular signal format that can be recognized by the programmed processor. In particular, the signal format for each of these signals will preferably begin with a header byte identifying the control parameter being transferred. The header byte will be followed by a byte containing the value of the denoted control parameter itself. The final byte will be a check sum of the header byte and the byte containing the value of the denoted control parameter. The infrared receiver interface 30 generates an interrupt pulse "P" to an interrupt input of the processor as the infrared signal is being received from the remote control. The infrared receiver interface generates pulses of encoded bits representing the aforementioned bytes from the infrared signal and sends these pulses to the processor following the interrupt pulse. The processor reads the header pulses defining the header byte as well as the data pulses defining the value of the control parameter and the check sum pulses. The processor will store the header byte and the control parameter value byte in a software buffer for later reading by the processor provided the check sum condition is satisfied.

It is to be appreciated that in addition to the above discussed pieces of control information, other control information can be similarly delivered to the processor 28 from either the systems controller 10 or the remote control device 18. In this regard, other pieces of control information having an identifiable header byte, a control parameter value byte and a check sum byte can be transmitted to and read by the processor 28 in the same manner as heretofore discussed for the network identification and HVAC unit type parameters.

Referring now to FIG. 3, an example of how control information for the HVAC system 12 is to ultimately be stored in memory 32 is illustrated. The examplary control information is stored in addressable memory locations having address indexes numbered zero through eleven. It is to be understood that these address indexes can represent or easily be mapped to the particular addresses of these memory locations. Each addressable memory location has a stored control parameter value in a lower byte portion of the addressable location and a stored verification image value in each upper byte portion of the same addressable memory location. The first stored control parameter value in memory address location zero is the heat control setting for the HVAC unit 34 whereas the control parameter value in memory address location five is a fan control setting for the HVAC unit 34. The stored verification images for the heat control value and for the fan control value as well as any other lower byte values in memory locations zero through five are stored in the respective upper byte portions of these memory locations. The stored verification images are preferably set equal to the same control parameter value stored in the lower byte portions of these memory locations.

The control parameter value identifying the particular type of HVAC unit to be controlled is preferably stored in the lower byte portions of three successive memory locations having address indexes six through eight. The verification image of this control parameter value is preferably stored in the upper byte portions of these memory locations. The verification images for each of the thus stored control parameter values are the ones compliment of the stored control parameter values.

The control parameter value for the network identification of the HVAC system 12 is preferably stored in the lower byte portions of three successive memory locations having address indexes nine through eleven. The verification image of this control parameter value is preferably stored in the upper byte portions of these memory locations. The verification images for each of thus stored control parameter values are the twos complement of these stored control parameter values.

Referring now to FIG. 4A, a process for reading the control information stored in the memory 32 begins with a step 40 that indicates that electrical power has been provided to the processor 28. The processor 28 proceeds to a step 42 and sets the memory address index "i" equal to zero. The processor proceeds in steps 44 through 50 to successively read the upper and lower bytes from address locations zero through five and compares these bytes for being mathematically equivalent in a step 47. In the event that the equivalency relationship is satisfied for a particular location, the processor will proceed in a step 48 to set a certain indexed control variable denoted as VARIABLE (k) equal to the lower byte of the memory location under examination. The processor preferably uses a look up table such as is set forth in FIG. 5 to identify the particular indexed control variable that is to be set equal to the lower byte of the memory location under examination. Referring again to step 47, in the event that the lower and upper bytes are not equivalent, the processor proceeds to set the indexed control variable for this memory location equal to a default value in a step 49. This is preferably accomplished by consulting the look up of FIG. 5 for the appropriate indexed variable and associated default value for the memory location. The processor increments the memory address index "i" in step 50 and proceeds to examine the bytes of the next memory location and thereafter set the identified indexed variable equal to the lower byte value or the default value.

When the memory address index, "i" equals six, the processor proceeds from step 44 to a step 52 wherein an inquiry is made as to whether the memory address index, "i" is equal to nine. Since the memory address will initially equal six, the processor will proceed to a step 54 and read both the lower and upper bytes from the particular memory address location identified by the memory address index "i". The processor proceeds in a step 56 to inquire whether the thus read upper byte from the memory address location "i" is equal to the ones compliment of the lower byte read from the same memory address location.

Referring to FIG. 3, the verification image stored in the upper byte portion of each addressable location identified by memory address indexes six through eight should be the ones compliment of the HVAC type control parameter value.

The above will not be the case if the value of the HVAC type control parameter or its ones compliment verification image are not properly read from the memory location under examination. In this case, the processor 28 will proceed out of step 56 along the no path to a step 58 and increment the memory address index "i" by one. The processor will thereafter return to step 52 and again proceed to step 54 if the new memory address index does not equal nine. Assuming that the memory address has merely been incremented from six to seven, the processor will proceed to step 54 and read the lower and upper bytes from the memory address location indicated by the memory address index "i" equal to seven. The processor will again inquire in step 54 as to whether the upper byte is equal to the ones compliment of the lower byte stored in this particular memory address location. Assuming that the control parameter value and its ones compliment verification image is correctly read from this addressable location, the processor will proceed from step 56 to step 60 and inquire as to whether the lower byte is within a specific range of permissible values. The permissible range of values for the HVAC type control parameter will have been previously provided to the processor 28 for the purpose of making the comparison in step 60. This range of values could, for instance, be part of the look up table of FIG. 5 and hence be immediately associated with the memory location from which the HVAC type control parameter was read. In the event that the lower byte from the addressable memory location identified by the current memory address index "i" is not within range, the processor will proceed along the no path out of step 60 and again increment the memory address index "i" in step 58 before returning to step 52. Assuming the memory address index has now been incremented to eight, the processor will proceed to step 54 and again read the lower and upper bytes from the corresponding memory location. Inquiry will next be made as to whether the upper byte is equal to the ones compliment of the lower byte in step 56. Assuming a correct mathematical relationship of these values, the processor will proceed to step 60 and again inquire as to whether the lower byte is within the predetermined range of permissible values for this control parameter. If the read value of the lower byte stored in memory storage location eight is within range of the permissible values for the control parameter, the processor will proceed to a step 62 and set a flag variable denoted as VALID_UT equal to true. It will thereafter set a variable denoted as UNIT_TYPE equal to the lower byte value in a step 64. Referring again to steps 52 and 60, it is to be noted that if all memory address locations having the memory address indexes six through eight do not have a properly stored and read control parameter value and a corresponding ones compliment verification image, then the processor will proceed in step 58 to increment the memory address index by one so as to be equal to nine. The processor will next proceed through step 52 to a step 66 wherein the UNIT_TYPE control variable is set equal to a default value. The processor proceeds to step 68 wherein the flag variable VALID_UT is set equal to false.

It is to be appreciated that as a result of potentially reading up to three storage locations having the memory address indexes six through eight, the processor will have had an opportunity to verify a correct reading of the upper and lower bytes from at least one of these storage locations. For any such verification, the processor will also need to find that the value of a verified lower byte is within the permissible range for the control parameter stored in these locations. In such a case, the processor will have set the VALID_UT flag variable equal to true in a step 62 and set the UNIT_TYPE control variable equal to the value of the lower byte in the particular storage location which passed the successive tests of steps 56 and 60. In the event that none of the byte values read from the storage locations six through eight passed the steps dictated by steps 56 and 60, then the processor will have set the UNIT_TYPE control variable equal to a default value from the look up table in FIG. 5 and set the flag variable VALID_UT equal to false. The UNIT_TYPE control variable will preferably appear in a control program executable by the processor 28 when it wishes to identify and take into account any particular control features for the particular type of unit.

The processor will proceed out of either step 64 or step 68 to a step 69 and set the memory address "i" equal to nine. The processor will proced to a step 70 wherein the process of reading and comparing lower and upper byte portions of one or more of the memory locations having address indexes nine through eleven will occur in steps 70 through 86. It is to be remembered from FIG. 3 that these particular memory locations will have been set aside for storing the value of the network identification parameter and the respective verification images therefore. It is to be appreciated that as a result of reading and comparing the byte portions of possibly all three of these addressable memory locations, the processor will have either set the network identifier variable, NTWK_ID, equal to a correctly verified control parameter value stored in one of these locations or it will have set the network identifier variable equal to a default value. The flag variable, FLAG_ID will be set equal to the appropriate true or false value. The $NTWK_{13}$ ID control variable will preferably appear in a communication protocol program executed by the processor 28 when it wishes to identify itself to the systems controller 10.

The processor will proceed out of either step 80 or step 86 to a step 88 wherein the flag variable noted as MEM_WRIT will be set equal to true. The processor proceeds from setting MEM_WRIT equal to true in step 88 to a step 90 wherein an inquiry is made as to whether MEM_WRIT is equal to true. MEM_WRIT will have been set equal to true in step 88 so as to thereby cause the processor to proceed to a step 92. As will become apparent hereinafter, the process beginning with step 92 is directed to writing values and respective verification images of values to the memory 32 under a variety of circumstances.

Referring to step 92, the memory address index "i" is set equal to zero. Another index "j" which will be used to track the number of write attempts to a particular memory location in the memory 32 is also set equal to zero. The processor proceeds to a step 94 and reads the lower and upper byte values from the memory location identified by the memory address index "i". Since "i" will initially be equal to zero, the memory address location identified by the memory address index "i" equal to zero will be read. Inquiry will next be made in step 96 as to whether the lower byte equals the upper byte portion of the particular memory location. As will be remembered from FIG. 3, the values for the control parameters stored in memory address locations zero through five should have the same equivalent verification images stored in the upper byte portions in each addressable storage location. If the control parameter and its verification image have been correctly matched, then the processor will proceed to a step 98 and inquire as to whether the lower byte value is equal to the value for the VARIABLE (k) presently being used by the processor 28. This is accomplished by consulting the look up table of FIG. 5 noting the particular VARIABLE (k) for the given location and then noting the value currently being used by the processor for this variable.

If the lower byte value read from the memory storage location "i" is equal to the value of the particular variable currently being used by the processor 28, then the processor will proceed directly to a step 100 and set "j" equal to zero and increment the memory address index, "i". The processor will proceed to step 102 and inquire as to whether the memory address index "i" equals six. If not, the processor will return to step 94 and again read the lower and upper bytes from the memory location identified by the new memory address index.

Referring again to steps 96 and 98, in the event that the lower byte value from the storage location "i" is either not equal to the upper byte value or if the lower byte value in the storage location "i" is not equal to the current value for the VARIABLE (k) in the processor 28, then the processor will proceed to a step 104. Referring to step 104, the value in the processor for the VARIABLE (k) is written to both the lower and upper byte portions of the memory location identified by the memory index "i". This is preferably accomplished by first identifying the particular VARIABLE (k) associated with the particular memory location through consulting the look up table heretofore discussed. The processor proceeds to set a flag denoted as RE_RUN equal to true in a step 106. The processor will proceed to increment the write attempt index "j" by one in step 108 before inquiring in step 110 as to whether the index "j" equals five. In the event that the write attempt index "j" is not equal to five, the processor will proceed to step 94 and again read the lower and upper byte portions of the memory location identified by the memory address index "i". If the previous write of the value of the VARIABLE (k) to both upper and lower byte portions of the memory location "i" was successful in step 104 and if the reading of these stored byte values is successful in step 94, then the lower byte will be equal to the upper byte value in step 96 and the lower byte value will be moreover equivalent to the value of the VARIABLE (k) in the processor 28. This will allow the processor to proceed through step 100 to step 102.

Referring again to step 110 in the event that the processor is unsuccessful in writing the value of the VARIABLE (k) and thereafter reading the appropriately stored lower and upper byte values from the memory 32 five successive times, then the processor will proceed from step 110 to step 100 and again set the write attempt index "j" equal to zero while incrementing the memory address index "i" by one. The processor will proceed through step 102 and successively read the lower and upper byte values for each of the memory address locations identified by each incremented address index and if necessary write the current value of the VARIABLE (k) to both upper and lower byte portions with a successive reading of the newly written value for up to five successive attempts before again setting the write attempt index "j" equal to zero and again incrementing the memory address index "i" in step 100. At such time as the memory address index "i" equals six, the processor will proceed from step 102 to a step 112.

Referring to step 112, the processor reads the lower and upper byte portions of the storage location indicated by the current memory address index "i". The processor proceeds in a step 114 to inquire as to whether the upper byte portion of the memory location equals a ones compliment of the lower byte portion of the read memory location. Referring to FIG. 3, the upper byte value for a memory location having a memory address index of six, seven or eight should have a ones compliment verification image stored therein. If the read upper and lower bytes have this relationship, then the processor will proceed to a step 116 and inquire as to whether the lower byte value is equal to the present value of the UNIT_TYPE control variable in the processor 28. In the event that the lower byte value read from the memory 32 at the particular address storage location does not equal the value of the UNIT_TYPE control variable, the processor proceeds along the no path out of step 116 to a step 118. Referring again to step 114, in the event that the upper byte does not have the correct ones compliment relationship with the read lower byte value, the processor will also proceed out of step 114 to step 118.

Referring to step 118, the processor inquires as to whether VALID_UT equals true. It will be remembered from steps 54 through 62 that VALID_UT will be true if the processor has previously successfully read and verified the relationship of upper byte to lower byte for at least one of the storage locations six through eight and has moreover verified that the lower byte is within a permissible range. Assuming that VALID_UT is true, the processor will proceed along the yes path to a step 120 wherein the value of the UNIT_TYPE control variable in the processor 28 is written to the lower byte portion of the memory location identified by the current memory address index "i". The processor now proceeds to step 122 and writes the ones compliment of the value of the UNIT_TYPE control variable in the processor 28 to the upper byte portion of the same memory location. The processor proceeds to set RE_RUN equal to true in step 124. The write attempt index "j" is incremented by one in step 126 before proceeding to inquire in step 128 as to whether this write attempt index "j" is equal to five. If it is not, the processor will proceed back to step 112 and again read the lower and upper byte portions of the memory location identified by the memory address index "i". To the extent that the write steps 120 and 122 were not previously successful or if the read step 112 is incorrect due to electrical noise, the processor will so note in either step 114 or step 116. In either case, the processor will again implement steps 118 through 128 wherein another write will be attempted to this particular memory location. The processor will continue to attempt to write to this memory location until the write attempt index "j" equals five in step 128 or until the upper byte has the appropriate relationship to the lower byte as required in step 114 and the lower byte is equal to the present value of UNIT_TYPE in the processor 28 as required in step 116. After any successful write has been verified in steps 114 and 116 or after five successive write attempts, the processor will proceed to a step 130 and increment the memory address index "i" by one and again set the write attempt index "j" equal to zero. The processor will next inquire in step 132 as to whether the memory address index "i" is equal to nine. As long as the memory index address "i" has not been incremented to nine, the processor will again re-execute steps 112 through 130 and attempt to verify that a correct value of UNIT_TYPE has been written to the respective lower byte location and that the ones compliment thereof has been correctly written to the upper byte location. When all three memory address locations have been read and written to if necessary and thereafter verified or if the process has been attempted up to five times for each memory location, then the processor will proceed out of step 132 to a step 134.

Referring to step 134, the processor will proceed to read lower and upper byte portions of the memory address location "i", which will correspond to the memory address location index nine. As has been previously discussed, memory address locations beginning with memory address index nine and ending with eleven will contain stored control parameter values for the $NTWK_{13}$ ID variable as well as the verification images of these values. The verification images will be the twos complement of these values. The processor will proceed to implement steps 134 through 154 in much the same manner as has been previously discussed for steps 112 through 132 only the relationship that is to exist between upper and lower byte portions is a twos complement and the value to be written to the lower byte portion will be that of the NTWK_ID variable. Following completion of steps 134 through 154, the processor will proceed to a step 156.

Referring to step 156, the processor inquires whether the RE_RUN flag is equal to true. It will be remembered that this flag is set equal to true in either step 106, 124 or step 146 if there has been a write to any particular memory location. If this has occurred, the processor will proceed to a step 158 and set RE_RUN equal to false. The processor thereafter proceeds to step 160 and inquires as to whether a communication has been received for any of the variables identified by variable index "k" numbered zero through five. It will be remembered that the processor 28 may receive a communication from either the system controller 10 or from a hand held remote control device 18 via an infrared receiver interface 30. It is to be understood that such a communication will preferably be received in a recognizable format allowing the processor to store a header byte identifying the control parameter followed by a byte of information containing the value of the control parameter in a software buffer. The processor will read any received header bytes in the software buffer in step 160 and note whether any of the header byte codes identify a control parameter stored in one of the memory locations having an address index of zero through five. If a header byte code corresponds to any such control parameter, the processor will note the corresponding indexed "k" variable from the look up table in FIG. 5. The processor will proceed to a step 162 and set the corresponding indexed variable equal to the value of the control parameter associated with the header byte. The processor will thereafter erase the header byte and associated control parameter byte value from the buffer memory. The processor will next proceed to a step 164 and set MEM_WRIT equal to true. The processor will thereafter exit the process of FIGS. 4A through 4D in a step 166 and execute various control routines that may be required at that point in time. Such routines could include typical process control of the HVAC unit 34 in performing a particular heating or cooling function that may be required in response to the current values in the processor 28 for the particular control variables. Upon completion of such control routines, the processor returns to step 90 and again inquires as to whether the MEM_WRIT is equal to true. Since MEM_WRIT will have been set equal to true in step 164, the processor proceeds to step 92 and again sets both the memory address index "i" and the index "j" equal to zero. The processor will again read the lower and upper bytes from the particular memory address identified by the memory address index "i" in a step 94. The inquiry will be made as to whether the lower and upper bytes are equal in step 96 before proceeding to the step 98 wherein inquiry will be made as to whether the lower byte equals the value of the particular variable corresponding to memory address location "i". It is to be appreciated that the value of at least one of the variables corresponding to locations zero through five will have possibly changed as a result of the processor having set at least one of these variables equal to a recently received communication in step 162. Such a changed value in a particular variable will prompt the processor to proceed along a no path out of step 98 to a step 104. The current value of the variable as defined in step 162 will be written to both the lower and upper bytes of the memory location having the memory address index "i". The processor will thereafter proceed to implement steps 106 through 156 as has been previously described.

Referring to step 156, since there will have been a write of the value of at least one of the variables having an index value "k" of zero to five, the RE_RUN flag will have been set equal to true prompting the processor to again proceed to set this flag equal to false in step 158. The processor will proceed to step 160 and again inquire as to whether a communication has been received for any of the variables having index values zero through five. In the event that a communication has not been received for any of these variables, the processor will proceed to a step 168 and inquire as to whether a communication has been received for the UNIT_TYPE control variable. This is accomplished by examining any header bytes stored in the software buffer memory to ascertain whether any of these header bytes identifies an HVAC type control parameter having been received from the remote control device. If a header byte code corresponds to the HVAC type control parameter, the processor will associate the corresponding UNIT_TYPE control variable therewith from the look up table of FIG. 5. The processor will proceed to a step 170 and set the UNIT_TYPE control variable equal to the stored control parameter byte associated with the header byte. The processor will thereafter erase the header byte and the associated control parameter value from the software buffer. The processor proceeds to set MEM_WRIT equal to true in step 172 and VALID_UT equal to true in a step 174. The processor will proceed to again execute various control routines in step 166 before returning to step 90 and begin again the process of reading and writing to the particular memory locations corresponding to the variables for which communicated values have been received. Since the value of the UNIT_TYPE control variable will have possibly changed in step 170, the processor will note any such change in step 116 when the memory address index equals six. The processor proceeds to step 118 and inquires whether VALID_UT is equal to true. Since this flag was set equal to true in step 174, the processor will proceed to write the current value of the UNIT_TYPE control variable to the lower byte portion of the particular indexed memory location. The processor will also write the ones compliment of this value to the upper byte portion of the memory location. The RE_RUN flag will be set equal to true in step 124. As has been previously discussed, the write steps of 120 and 122 will be repeated up to four times in the event that the reading of the upper and lower bytes in step 112 and the subsequent comparison in step 116 does not verify a proper relationship between the upper and lower bytes. The processor will proceed to do the same for each memory location having a memory address index of seven or eight. Following writes and verifications to all three memory locations, the processor will proceed through steps 134, 136, 138, 152 and 154 to step 156 and inquire as to whether RE_RUN equals true. Since RE_RUN will be true as a result of step 124, the processor will again proceed to step 160.

Assuming that no communications have been received for control parameters that would prompt the setting of the indexed variables zero through five or the UNIT_TYPE control variable equal to such control parameters, the processor will proceed along the no path out of steps 160 and 168 to a step 176 wherein inquiry is made as to whether a communication has been received for the NTWK_ID variable. This is accomplished by examining any header byte stored in the software buffer memory to ascertain whether any of these header bytes indicates that a network identification control parameter has been received from the remote control device 18. If a header byte code corresponds to the network identification control parameter, the processor will associate the corresponding NTWK_ID variable therewith through the look up table in FIG. 5. The processor will proceed to set the NTWK_ID variable equal to the stored control parameter byte associated with this header byte in step 178 before proceeding to set MEM_WRIT and VALID_ID equal to true in steps 180 and 182. The processor will proceed to step 166 and hence back to step 90. The processor will now proceed through steps 92 through 136 as has been previously discussed and will possibly note that the lower byte of memory address location having a memory address index of nine will not equal the current value of the NTWK_ID variable in a step 138. This will prompt the normal writing of the current value of the NTWK_ID variable to the memory locations nine through eleven in steps 142 through 154. The RE_RUN will be set equal to true in step 146 if this occurs. The processor will now proceed through steps 156 and 158 and set RE_RUN equal to false.

Referring again to steps 160, 168 and 176, the processor will proceed along the no paths out of each of these steps if no communications have been received by the processor for any of the noted variables. The processor will proceed out of step 176 to step 166 and execute any control routines before again returning to step 90. Since MEM_WRIT remains true, the processor will again proceed through steps 92 to 156. Assuming that all verifications are successfully made at the first reading of all upper and lower bytes from all memory locations, the processor will note that the RE_RUN is false in step 156. This will prompt the processor to proceed to a step 184 and set MEM_WRIT equal to false. Assuming no communications have been received for indexed variables zero through five or for the UNIT_TYPE control variable, the processor will proceed through steps 160, 168 and 176 to step 90. Since MEM_WRIT is now false, the processor will proceed along the no path out of step 90 to step 160. It is to be appreciated that the processor will continue to execute only steps 160, 168, 176, 166 and hence go back to step 90 until a communication has been received for any monitored variable. As has been previously discussed, any change in value of any variable associated with the memory locations having memory address indexes zero through eleven will prompt the reading and writing to either the single memory location for variables zero through five or the three designed memory locations for the UNIT_TYPE control variable or the three designated memory locations for the NTWK_ID variable. This reading and writing should result in a unique verification image being written to three separate memory locations for the UNIT_TYPE control variable and the three separate memory locations for the NTWK_ID variable. In the event such readings and writings are subject to a high electrical noise environment, then readings followed by writings will occur up to five successive times for each memory location. When repeated reading and writings are required to any of these locations, the processor will continue to note that a rerun condition is present and hence the entire process will be repeated until all memory locations are correctly read and verified the first time.

Referring again to step 40 in the event that power is turned off or lost at any time, the processor will note when power is again turned on. The processor will proceed to set the indexed variables associated with the memory locations having memory address indexes zero through five equal to read lower byte portions of these respective locations in steps 44 through 50. The processor will proceed next to steps 52 through 68 and examine as many of the addressable memory locations having memory address indexes of six through eight as is necessary to pass the tests dictated by steps 56 and 60. When a pair of upper and lower byte portions of one of these memory locations have the appropriate ones complement relationship required in step 56 and when the lower byte of the same location is within range in step 60, the processor will proceed to step 64 and set the UNIT_TYPE variable equal to the value of the lower byte portion of the particular memory location. In the event that none of the addressable memory locations have upper and lower byte portions that will pass the tests dictated by steps 56 and 60, the processor will proceed to step 66 and set the UNIT_TYPE variable equal to a default value.

Referring to steps 70 through 86, the processor will proceed to examine as many of the addressable memory locations having memory address indexes of nine through eleven as is necessary to pass the tests dictated by steps 74 and 76. This should normally result in the NTWK_ID variable being set equal to the lower byte portion of the first addressable memory location which passes the tests dictated by steps 74 and 76. If no such memory locations pass these tests, then the NTWK_ID variable is set equal to the default value in step 84.

It is to be appreciated from the above that a process has been disclosed for accurately writing the values of at least two variables to the first portions of a number of memory locations associated with each variable. The writing of the values of these variables is also accompanied by a corresponding writing of the verification image to second portions of the same memory locations. A writing to any of these locations is accompanied by a reading of all memory locations wherein values have been stored to verify that the values and corresponding verification images of all variables have been correctly stored. Readings followed by writings will continue to occur until all recorded values and respective verification images can be read without any error.

It is to be appreciated that a particular embodiment of the invention has been described. Alterations, modifications and improvements thereto will readily occur to those skilled in the art. Accordingly, the foregoing description is by way of example only and the invention is to be limited only by the following claims and equivalents thereto.

What is claimed is:

1. A process for writing control parameter information to addressable memory locations of a memory associated with a programmed processor wherein the control parameter information is used by the processor to control a unit that provides conditioned air to a space to be heated or cooled, said process comprising the steps of:

receiving the value of a control parameter that is to be used by the processor to control the unit providing conditioned air;

associating the control parameter that is to be used by the processor to control the unit providing conditioned air with at least one addressable memory location;

writing the value of the control parameter to a first portion of each addressable memory location associated with the control parameter;

transforming the value of the control parameter in accordance with a particular mathematical transformation that is not to be used to transform values received for any other control parameters so as to produce a verification image having a unique mathematical relationship with respect to the value of the control parameter; and writing the verification image of the value of the particular control parameter to a second portion of each addressable memory location associated with the control parameter.

2. The process of claim 1 further comprising the steps of:

reading the first and second portions of each addressable memory location associated with the control parameter following said step of writing the verification image of the control parameter to the second portion of each memory location associated with the control parameter; and examining the relationship of the first and second read portions of each addressable memory location associated with the control parameter following said step of reading the first and second portions of each addressable memory location associated with the control parameter to determine whether the mathematical relationship dictated by said step of transforming the value of the control parameter to a respective verification image exists.

3. The process of claim 2 further comprising the step of:

rewriting the value of the control parameter and its respective verification image to the first and second portions of each addressable memory location associated with the control parameter when said step of examining the relationship between the first and second read portions of each addressable memory location associated with the control parameter does not indicate the existence of the mathematical relationship dictated by said step of transforming the value of the control parameter to a respective verification image in any addressable memory location associated with the control parameter.

4. The process of claim 3 further comprising the steps of:

rereading the first and second portions of each addressable memory location associated with the control parameter following said step of rewriting the value of the control parameter and its respective verification image to the first and second portions of each addressable memory location associated with the control parameter; and re-examining the relationship between the first and second read portions of each addressable memory location associated with the control parameter to determine whether the mathematical relationship dictated by said step of transforming the value of the particular control to a respective verification image exists.

5. The process of claim 4 further comprising the step of:

repeating said steps of rewriting the value of the control parameter and its respective verification image to the first and second portions of each addressable memory location associated with the control parameter and thereafter rereading and re-examining these first and second portions each time said step of re-examining the relationship between the first and second read portions of each addressable memory location associated with the particular control parameter does not indicate the existence of the mathematical relationship dictated by said step of transforming the value of the particular control parameter to a respective verification image in any memory location associated with the control parameter.

6. The process of claim 1 further comprising the steps of:

reading the first and second portions of an addressable memory location associated with the particular control parameter following the writing of the verification image to the second portion of any such addressable memory location;

examining the relationship between the first and second read portions of any such addressable memory location to determine whether the mathematical relationship dictated by said step of transforming the value of the particular control parameter to a respective verification exists between the first and second read portions of any such addressable memory location;

rewriting the value of the control parameter and its respective verification image to the first and second portions of any such addressable memory location when said step of examining the relationship between the first and second portions of any such addressable memory location does not indicate the existence of the mathematical relationship dictated by said step of transforming the value of the particular control parameter.

7. The process of claim 6 further comprising the steps of:

rereading the first and second portions of any such addressable memory location associated with the control parameter following said step of rewriting the value of the control parameter and its respective verification image to the first and second portions of any such addressable memory location associated with the control parameter; and re-examining the relationship between the first and second read portions of any such addressable memory location associated with the control parameter to determine whether the mathematical relationship dictated by said step of transforming the value of the particular control to a respective verification image exists.

8. The process of claim 7 further comprising the step of:

repeating said steps of rewriting the value of the control parameter and its respective verification image to the first and second portions of any such addressable memory location associated with the control parameter and thereafter rereading and re-examining these first and second portions each time said step of re-examining the relationship between the first and second read portions of any such addressable memory location associated with the particular control parameter does not indicate the existence of the mathematical relationship dictated by said step of transforming the value of the particular control parameter to a respective verification image in any such memory location associated with the control parameter until said step of rewriting the value of the control parameter and its respective verification image has been repeated a predetermined number of times.

9. The process of claim 8 further comprising the step of:

proceeding to read and examine the first and second portions of any further addressable memory locations associated with the control parameter and rewrite if necessary the value of the control parameter and its respective verification image to the first and second portions of such a further addressable memory location when the mathematical relationship between said first and second portions of the further addressable memory location does not conform to the mathematical relationship dictated by said step of transforming the value of the particular control parameter.

10. The process of claim 9 further comprising the steps of:

rereading the first and second portions of any such further addressable memory location associated with the control parameter following the rewriting if necessary of the value of the control parameter and its respective verification image to the first and second portions of any such further addressable memory location associated with the control parameter; and re-examining the relationship between the first and second read portions of any such further addressable memory location associated with the control parameter to determine whether the mathematical relationship dictated by said step of transforming the value of the particular control to a respective verification image exists.

11. The process of claim 10 further comprising the step of:

repeating said steps of rewriting the value of the control parameter and its respective verification image to the first and second portions of any such further addressable memory location associated with the control parameter and thereafter rereading and re-examining these first and second portions each time said step of re-examining the relationship between the first and second read portions of any such further addressable memory location associated with the particular control parameter does not indicate the existence of the mathematical relationship dictated by said step of transforming the value of the particular control parameter to a respective verification image in any such further memory location associated with the control parameter until said step of rewriting the value of the control parameter and its respective verification image has been repeated a predetermined number of times.

12. The process of claim 1 wherein the particular mathematical transformation used in said step of transforming the value of the particular control parameter is a numerical complement of the value of the control parameter.

13. A process for storing values of control parameters in a memory associated with a programmed processor wherein the values of the control parameters are used by the programmed processor to control a unit that provides conditioned air to a space to be heated or cooled, said process comprising the steps of:

reading the value of a first portion of an addressable memory location associated with a first control parameter;

reading the value of a second portion of the same addressable memory location associated with the first control parameter;

comparing the read value of the first portion of the addressable memory location associated with the first control parameter with the read value of the second portion of the same addressable memory location associated with the first control parameter so as to determine whether a certain predetermined mathematical relationship exists between the value of the first and second portions of the addressable memory location associated with the first control parameter;

writing the current value of a program variable associated by the programmed processor with the first control parameter to the first portion of the addressable memory location associated with the first control parameter when said step of comparing the read value of the first portion of the addressable memory location with the read value of the second portion of the same addressable memory location indicates that the predetermined mathematical relationship between the value of the first portion and the value of the second portion of the same addressable memory location associated with the first control parameter does not exist;

reading the value of a first portion of an addressable memory location associated with a second control parameter;

reading the value of a second portion of the same addressable memory location associated with the second control parameter;

comparing the read value of the first portion of the addressable memory location associated with the second control parameter with the read value of the second portion of the same addressable memory location associated with the second control parameter to determine whether a certain predetermined mathematical relationship exists between the value of the first and second portions of the addressable memory location associated with the second control parameter wherein the predetermined mathematical relationship between the value of the first and second portions of the addressable memory location associated with the second control parameter is substantially different from the predetermined mathematical relationship between the value of the first and second portions of the addressable memory location associated with the first control parameter; and writing the current value of a program variable associated by the programmed processor with the second control parameter to the first portion of the addressable memory location associated with the second control parameter when said step of comparing the read values of the first and second portions of the addressable memory location associated with the second control parameter does not indicate that the predetermined mathematical relationship exists between the read values of the first and second portions of the addressable memory location associated with the second control parameter.

14. The process of claim 13 further comprising the steps of:

writing a verification image of the current value of the program variable associated by the programmed processor with the first control parameter to the second portion of the addressable memory location associated with the first control parameter when said step of comparing the value of the first and second portions of the addressable memory location associated with the first control parameter indicates that the particular predetermined mathematical relationship between the read values of the first and second portions of the addressable memory location associated with the first control parameter does not exist, the verification image written to the second portion having the particular mathematical relationship to the value written to the first portion that is required between the first and second portions of the addressable memory location associated with the first control parameter; and writing a verification image of the value written to the first portion of the addressable memory location associated with the second control parameter to the second portion of the addressable memory location associated with the second control parameter when said step of comparing the read values of the first and second portions of the addressable memory location associated with the second control parameter indicates that the mathematical relationship between the first and second portions of the addressable memory location associated with the second control parameter does not exist, the verification image written to the second portion of the addressable memory location associated with the second control parameter having the particular mathematical relationship required between the first and second portions of the addressable memory location associated with the second control parameter.

15. The process of claim 14 wherein said steps of writing verification images of the values written to the first portions of the addressable memory locations associated respectively with either the first or second control parameters each comprise the steps of:

transforming the values written to the first portion of the respective addressable memory locations to the verification images to be written to the second portion of the respective addressable memory locations in accordance with the particular predetermined mathematical relationship that is to exist between the first and second portions of the respective addressable memory locations; and writing the transformed values to the second portions of the respective memory locations.

16. The process of claim 13 further comprising the steps of:

comparing the read value of the first portion of the addressable memory location associated with the first control parameter with the current value of the program variable associated by the programmed processor with the first control parameter when said step of comparing the read value of the first portion of the addressable memory location associated with the first control parameter with the read value of the second portion of the same addressable memory location indicates that the predetermined mathematical relationship between the value of the first portion and the second portion of the same addressable memory location does exist;

writing the current value of the program variable associated by the programmed processor with the first control parameter to the first portion of the addressable memory location associated with the first control parameter when said step of comparing the read value of the first portion of the addressable memory location associated with the first control parameter with the current value of the program variable associated by the programmed processor with the first control parameter indicates the read value of the first portion of the addressable memory location associated with the first control parameter does not equal the current value of the program variable associated by the processor with the first control parameter;

comparing the read value of the first portion of the addressable memory location associated with the second control parameter with the current value of the program variable associated by the programmed processor with the second control parameter when said step of comparing the read value of the first portion of the addressable memory location associated with the second control parameter with the read value of the second portion of the same addressable memory location indicates that the predetermined mathematical relationship between the value of the first portion and the value of the second portion of the same addressable memory location does exist; and writing the current value of the program variable associated by the programmed processor with the second control parameter to the first portion of the addressable memory location associated with the second control parameter when said step of comparing the read value of the first portion of the addressable memory location associated with the second control parameter with the current value of the program variable associated by the programmed processor with the second control parameter indicates the read value of the first portion of the addressable memory location associated with the second control parameter does not equal the current value of the program variable associated by the programmed processor with the second control parameter.

17. The process of claim 16 further comprising the steps of:

writing a verification image of the current value of the program variable associated by the programmed processor with the first control parameter to the second portion of the addressable memory location associated with the first control parameter when said step of comparing the read value of the first portion of the addressable memory location associated with the first control parameter with the current value of the program variable associated by the programmed processor with the first control parameter indicates the read value of the first portion of the addressable memory location associated with the first control parameter does not equal the current value of the program variable associated by the processor with the first control parameter; and writing a verification image of the current value of the program variable associated by the programmed processor with the second control parameter to the second portion of the addressable memory location associated with the second control parameter when said step of comparing the read value of the first portion of the addressable memory location associated with the second control parameter with the current value of the program variable associated by the programmed processor with the second control parameter indicates the read value of the first portion of the addressable memory location associated with the second control parameter does not equal the current value of the program variable associated by the processor with the second control parameter.

18. The process of claim 17 further comprising the steps of:

rereading and recomparing the values read from the first and second portions of the addressable memory location associated with the first control parameter;

rewriting the value of the program variable associated by the programmed processor with the first control parameter and the respective verification image of this value when said step of rereading and recomparing values read from the first and second portions of the addressable memory location associated with the first control parameter indicates the predetermined mathematical relationship between the first and second portions of the addressable memory location does not exist.

19. The process of claim 18 further comprising the steps of:

recomparing the value of the program variable associated with the first control parameter with the first portion of the addressable memory location associated with the first control parameter when said step of rereading and recomparing values read from the first and second portion of the addressable memory location associated with the first control variable indicates the predetermined mathematical relationship between the first and second portions of the addressable memory location does exist; and rewriting the value of the program variable associated by the programmed processor with the first control parameter and the respective verification image of this value when said step of recomparing the value of the program variable associated with the first control parameter with the first portion of the addressable memory location associated with the first control parameter indicates the read value of the first portion of the addressable memory location associated with the first control parameter does not equal the value of the program variable associated by the processor with the first control parameter.

20. The process of claim 19 further comprising the steps of:
rereading and recomparing the values read from the first and second portions of the addressable memory location associated with the second control parameter;
rewriting the value of the program variable associated by the programmed processor with the second control parameter and the respective verification image of this value when said step of rereading and recomparing values read from the first and second portions of the addressable memory location associated with the second control parameter indicates the predetermined mathematical relationship between the first and second portions of the addressable memory location does not exist.

21. The process of claim 20 further comprising the steps of:
recomparing the value of the program variable associated with the second control parameter with the second portion of the addressable memory location associated with the second control parameter when said step of rereading and recomparing values read from the first and second portion of the addressable memory location associated with the second control variable indicates the predetermined mathematical relationship between the first and second portions of the addressable memory location does exist; and
rewriting the value of the program variable associated by the programmed processor with the second control parameter and the respective verification image of this value when said step of recomparing the value of the program variable associated with the second control parameter with the first portion of the addressable memory location associated with the second control parameter indicates the read value of the first portion of the addressable memory location associated with the second control parameter does not equal the value of the program variable associated by the processor with the second control parameter.

22. The process of claim 13 further comprising the steps of:
reading the value of a first portion of at least one additional addressable memory location associated with the second control parameter;
reading the value of a second portion of the additional addressable memory location associated with the second control parameter;
comparing the read value of the first and second portions of the additional addressable memory location associated with the second control parameter to determine whether a certain predetermined mathematical relationship exists between the value of the first and second portions of the additional addressable memory location associated with the second control parameter wherein the predetermined mathematical relationship between the value of the first and second portions of the additional addressable memory location associated with the second control parameter is the same as the predetermined mathematical relationship of the values of the first and second portions of the addressable memory location associated with the second control parameter that have been previously read and compared with each other; and
writing the current value of the program variable associated by the programmed processor with the second control parameter to the first portion of the additional addressable memory location associated with the second control parameter when said step of comparing the read first and second portions of the additional addressable memory location associated with the second control parameter does not indicate that the particular mathematical relationship exists between the read values of the first and second portions of the additional addressable memory location associated with the second control parameter.

23. The process of claim 22 further comprising the step of:
writing a verification image of the value written to the first portion of the additional addressable memory location associated with the second control parameter to the second portion of the additional addressable memory location associated with the second control parameter when said step of comparing the read values of the first and second portions of the additional addressable memory location associated with the second control parameter indicates that the mathematical relationship between the first and second portions of the additional addressable memory location associated with the second control parameter does not exist, the verification image written to the second portion of the additional addressable memory location associated with the second control parameter having the same particular mathematical relationship to the value written to the first portion of the additional addressable memory location associated with the second control parameter as is required between the first and second portions of the addressable memory location associated with the second control parameter previously read and compared with each other.

24. The process of claim 22 further comprising the step of:
comparing the read value of the first portion of the additional addressable memory location associated with the second control parameter with the current value of the program variable associated by the programmed processor with the second control parameter when said step of comparing the read values of the first and second portion of the additional addressable memory location associated with the second control parameter indicates that the predetermined mathematical relationship between the value of the first portion and the value of the second portion of the additional addressable memory location associated with the second control parameter does exist; and
writing the current value of the program variable associated by the programmed processor with the second control parameter to the first portion of the additional addressable memory location associated with the second control parameter when said step of comparing the read value of the first portion of the additional addressable memory location associated with the second control parameter with the current value of the program variable associated by the programmed processor with the second control parameter indicates the read value of the first portion of the additional addressable memory location associated with the second control parameter does not equal the current value of the program variable associated by the programmed processor with the second control parameter.

25. The process of claim 24 further comprising the step of:

writing a verification image of the current value of the program variable associated by the programmed processor with the second control parameter to the second portion of the additional addressable memory location associated with the second control parameter when said step of comparing the read value of the first portion of the additional addressable memory location associated with the second control parameter with the current value of the program variable associated by the programmed processor with the second control parameter indicates the read value of the first portion of the additional addressable memory location associated with the second control parameter does not equal the current value of the program variable associated by the processor with the second control parameter.

26. The process of claim 25 further comprising the steps of:

writing a verification image of the current value of the program variable associated by the programmed processor with the second control parameter to the second portion of the additional addressable memory location associated with the second control parameter when said step of comparing the read value of the first portion of the addressable memory location associated with the second control parameter with the current value of the program variable associated by the programmed processor with the second control parameter indicates the read value of the first portion of the additional addressable memory location associated with the second control parameter does not equal the current value of the program variable associated by the processor with the second control parameter.

27. The process of claim 25 further comprising the steps of:

rereading and recomparing the values read from the first and second portions of the additional addressable memory location associated with the second control parameter;

rewriting the value of the program variable associated by the programmed processor with the second control parameter and the respective verification image of this value when said step of rereading and recomparing values read from the first and second portions of the additional addressable memory location associated with the second control parameter indicates the predetermined mathematical relationship between the first and second portions of the additional addressable memory location does not exist.

* * * * *